United States Patent [19]

Itoh et al.

[11] Patent Number: 4,857,427

[45] Date of Patent: Aug. 15, 1989

[54] RECORDING MEDIUM

[75] Inventors: Hiroyuki Itoh, Kawasaki; Takafumi Ishii; Tetsuo Satoh, both of Yokohama, all of Japan

[73] Assignee: Nippon Oil Company, Limited, Tokyo, Japan

[21] Appl. No.: 236,338

[22] Filed: Aug. 19, 1988

Related U.S. Application Data

[63] Continuation of Ser. No. 7,650, Jan. 28, 1987, abandoned.

[30] Foreign Application Priority Data

Jan. 29, 1986 [JP] Japan .................................. 61-15779

[51] Int. Cl.$^4$ ...................... G03C 11/00; C09K 19/00; G02F 1/03
[52] U.S. Cl. .......................................... 430/19; 430/20; 430/21; 430/945; 428/1; 346/135.1; 528/328
[58] Field of Search ................. 346/135.1; 430/19, 20, 430/21, 945; 428/1

[56] References Cited

U.S. PATENT DOCUMENTS 3,119,794  1/1964  DeVries et al. ...................... 260/78
3,655,971  4/1972  Haas et al. ............................. 430/19
4,743,675  5/1988  Watanabe ............................... 428/1

FOREIGN PATENT DOCUMENTS 0208419  1/1987  European Pat. Off. ............ 525/420

OTHER PUBLICATIONS

Watanabe et al., Macromolecules, 17, 1004–1009, (1984).
Watanabe et al., Macromolecules, 18, 2141–2148, (1985).

Primary Examiner—Paul R. Michl
Assistant Examiner—Cynthia Hamilton
Attorney, Agent, or Firm—Scully, Scott, Murphy & Presser

[57] ABSTRACT

A recording medium having a base and a recording layer provided on said base, said recording layer consisting essentially of a thermotropic cholesteric liquid crystalline glutamate copolymer represented by the following general formula:

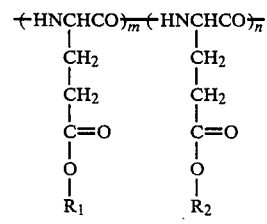

wherein $R_1$ is an alkyl, cycloalkyl, aryl or arylalkyl group having not more than 10 carbon atoms, $R_2$ is an alkyl, cycloalkyl, aryl or arylalkyl group having 6 to 30 carbon atoms, provided $R_1$ and $R_2$ are not the same, and m and n are in the relation of $50 \leq m+n \leq 2{,}000$, $m/n = 80 \sim 10/20 \sim 90$.

4 Claims, No Drawings

RECORDING MEDIUM

This application is a continuation of application Ser. No. 007,650 filed Jan. 28, 1987, now abandoned.

BACKGROUND OF THE INVENTION

The present invention relates to a recording medium.

Recently, with progress of the laser technique, optical discs which utilize a laser beam to effect writing and reading of information have been put to practical use and extensive studies have been made thereon. Optical discs have such features as noncontacting operation, high recording density and stable preservation of recorded information. With these features, optical discs have first been used practically as a digital audio disc and a video disc both for reproduction only and then as a postscript type disc for document filing which permits the user to write information freely. Studies and developments have been made extensively also with respect to a rewritable type which permits the user to write and erase information freely in a repeated manner. And various proposals have been made on such rewritable type disc.

Inorganic materials such as tellurium compounds, amorphous rare earth elements, transition metals and magnetic alloys have been mainly used as recording materials in postscript type discs. However, these inorganic materials do not always satisfy the conditions required for recording materials, such as a superior memory characteristic, a high reliability and the capability of being mass-produced inexpensively. Also, a serious problem exists in point of toxicity. The use of organic materials such as organic coloring matters has also been tried actively which materials, however, have not been put to practical use yet because of inferior light resistance (resistance to ultraviolet rays). These materials, when used as recording materials, are each formed into a thin film on a substrate. But the formation of film requires such a technique as vapor deposition which, coupled with the high cost of the raw materials, causes an increase in cost of the resulting disc. Further, in most of discs made from those materials, small holes are formed at the time of recording by the melting of metal or the decomposition and evaporation of coloring matter. Consequently, a large quantity of heat is required for recording.

As rewritable optical recording materials, both inorganic systems such as Te-O-Ge-Sn, Sn-Te-Se and Ga-Te-Se systems and organic systems using photochromic materials, e.g. spiropyran, have been studied actively. However, the use of inorganic systems involves drawbacks such as the difficulty of attaining both a stable recorded condition and a high speed erasability as well as toxicity, difficulty of forming a thin film and a high cost. The use of photochromic materials also involves a serious problem that the repetitive stability is poor due to side reactions. Thus, neither organic nor inorganic systems have been put to practical use.

SUMMARY OF THE INVENTION

It is the object of the present invention to provide a novel recording medium free from the above-mentioned drawbacks. More concretely, the present invention provides a novel recording medium which is capable of being manufactured in a simple manner using relatively inexpensive materials, further capable of preserving recorded information semipermanently and effecting rewriting and in which heat induced by laser beam is fed to a required portion to form a cholesteric liquid crystal structure and a difference in reflectance or transmissivity caused by a selective reflection phenomenon of selectively reflecting light of a specific wave length peculiar to cholesteric liquid crystal is utilized to effect reading of information.

The present invention resides in a recording medium using as a recording layer a thermotropic cholesteric liquid crystalline glutamate copolymer represented by the following general formula:

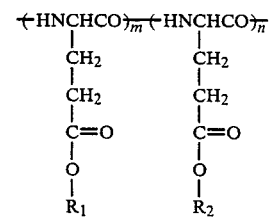

wherein $R_1$ is an alkyl, cycloalkyl, aryl or arylalkyl group having 1 to 10 carbon atoms, $R_2$ is an alkyl, cycloalkyl, aryl or arylalkyl group having 6 to 30 carbon atoms, provided $R_1$ and $R_2$ are not the same, and m and n are in the relation of $50 \leq m+n \leq 2{,}000$, $m/n = 80 \sim 10/20 \sim 90$.

DETAILED DESCRIPTION OF THE INVENTION

According to the present invention there is provided a recording medium having a base and a recording layer provided on the base, the recording layer being formed from a thermotropic cholesteric liquid crystalline glutamate copolymer which at room temperature or thereabouts scarcely forms a liquid crystal structure, not having the ability of reflecting light of a specific wave length selectively, but forms a cholesteric liquid crystal in a liquid crystal forming temperature region with increase in temperature caused by radiation of laser beam. After removal of the laser beam, a fine irradiated area is cooled rapidly whereby the cholesteric liquid crystal structure is fixed to hold recorded information.

Once a cholesteric structure is formed, it becomes possible to reflect light of a specific wave length selectively according to a cholesteric pitch of the cholesteric structure. Therefore, by setting recording conditions to match the said wave length with that of the laser beam, reading can be easily effected utilizing a difference in reflectance or transmissivity. For erasing recorded information, a part or the whole of the disc is heated and then cooled slowly, thereby allowing relaxation of the cholesteric structure to take place and the selective reflection ability to be eliminated, whereby the recorded information is erased to make rewriting possible.

As the base in the recording medium of the present invention there may be used a plastic film or sheet such as, for example, a film or sheet of polycarbonate resin, acrylic resin, polyether imide resin, polyimide resin, or poly(4-methyl-1-pentene), or a glass plate, or the said film or sheet plus a reflective layer formed thereon by vapor metallizing or plating, or a film or sheet of a metal having a mirror surface. Conversely, a layer of black or dark color difficult to reflect light may be provided on the side opposite to the reading light applying side of the recording layer, whereby in a non-recorded area of the recording layer light is transmitted almost completely and absorbed by the black layer so is scarcely reflected, while a recorded area reflects light selectively, so reading can be done more clearly at a higher sensitivity and there is attained a high S/N ratio.

The recording layer on the base is a film of a thermotropic cholesteric liquid crystalline glutamate copolymer, which is formed on the base in a thickness of 0.01 to 10 μm by a conventional method. The recording medium may be further covered with a transparent film as a protective film.

In order for the glutamate copolymer used as the recording layer in the present invention to exhibit a thermotropic cholesteric liquid crystallinity it is necessary that the difference in the number of carbon atoms between $R_1$ and $R_2$ in the foregoing general formula be not smaller than five. If the said difference is four or less, the copolymer will not exhibit a thermotropic cholesteric liquid crystallinity.

Regarding the substituent $R_1$, preferred examples of alkyl groups are methyl, ethyl, propyl, isopropyl, butyl, pentyl, hexyl, octyl, decyl, as well as alkyl groups which are the same in the number of carbon atoms as those just exemplified and which are of a branched structure. Particularly, methyl, ethyl, propyl, butyl and branched butyl are preferred. As preferred examples of cycloalkyl groups are mentioned cyclopentyl, cyclopentylmethyl, methylcyclopentyl, ethylcyclopentyl, butylcyclopentyl, cyclohexyl, methylcyclohexyl, ethylcyclohexyl, butylcyclohexyl, cyclohexylmethyl, cyclohexylethyl, cyclohexylpropyl, and cyclohexylbutyl, with cyclopentyl, cyclohexyl, cyclopentylmethyl and cyclohexylmethyl being particularly preferred. As examples of aryl groups are mentioned phenyl, methoxyphenyl, tolyl and dimethyltolyl. As examples of arylalkyl groups are mentioned benzyl, methylbenzyl, phenylethyl, methylphenylethyl, phenylpropyl and phenylbutyl, with benzyl and methylbenzyl being preferred.

Regarding the substituent $R_2$, preferred examples of alkyl groups are hexyl, heptyl, octyl, decyl, dodecyl, octadecyl, hexadecyl, eicosanyl, as well as alkyl groups which are the same in the number of carbon atoms as those just exemplified and which are of a branched structure. Particularly, hexyl, decyl, dodecyl and octadecyl are preferred. Examples of cycloalkyl groups are cyclohexyl, methylcyclohexyl, ethylcyclohexyl, butylcyclohexyl, hexylcyclohexyl, cyclooctyl, methylcyclooctyl, and cyclododecyl. Examples of aryl groups are phenyl, tolyl, butylphenyl, decylphenyl and dodecylphenyl. Examples of arylalkyl groups are benzyl, phenylethyl, phenylpropyl, phenylbutyl, phenylhexyl, phenyloctyl, phenyldodecyl, methylphenylbutyl, ethylphenylhexyl, and methylphenyldodecyl, with phenylhexyl, phenyldodecyl and phenyloctyl being particularly preferred.

The ratio of m to n in the foregoing general formula is in the range of 80~10/20~90, preferably 70~40/30~60. Outside this range, a thermotropic cholesteric liquid crystallinity will not be developed clearly. The sum of m and n, i.e., the degree of polymerization is in the range of 50 to 2,000, preferably 100 to 1,500. A degree of polymerization smaller than 50 will cause a difficulty in developing the liquid crystal structure, and a too large polymerization degree will result in deteriorated mold-ability and a delayed growth of the cholesteric structure.

The copolymer used in the present invention can be prepared by various methods. An example is NCA process known in this field which process involves copolymerization of predetermined two kinds of anhydrous N-carboxyglutamic acid-γ-esters (NCA). Also adopted preferably is a process in which a polymer such as poly(γ-methyl-L-glutamate) or poly(γ-benzyl-L-glutamate) is first prepared and then a part of the ester groups in the polymer are subjected to ester interchange using a predetermined alcohol.

The glutamate copolymer having a thermotropic cholesteric liquid crystallinity in the present invention possesses the following features suitable for use as a recording medium.

(1) Since the copolymer is prepared using glutamic acid which is easily available industrially, it is easy and inexpensive to manufacture and is free of toxicity.

(2) A thin film is obtained easily.

(3) Recording is effected not by forming small holes but by utilizing a mere change in molecular orientation from random to cholesteric structure, so the energy required for writing is small.

(4) Consequently, recorded information can be erased easily with a reduced amount of energy.

(5) Since a selective light reflection peculiar to the cholesteric structure is utilized, the difference in reflectance between recorded and non-recorded portions is large and both read sensitivity and S/N ratio are high.

(6) Unless heating is made above the liquid crystal transition temperature, the cholesteric structure will be maintained semipermanently, thus ensuring a stable preservation of record.

The copolymer in the present invention is used at a film thickness of 0.01 to 10 μm, preferably 0.1 to 5 μm, as a recording layer.

The cholesteric liquid crystal forming temperature varies from room temperature up to 250° C. depending on the degree of polymerization, composition or the kind of ester groups of the copolymer. But from the standpoint of record preservation it is desirable to select a polymerization degree, composition or ester groups so that a liquid crystal forming region exists in the range of 100° to 200° C.

When the cholesteric pitch is p and an average refractive index is n, a selective reflection wave length λ of the cholesteric liquid crystal is represented as $\lambda = n \cdot p$ in the case where light is incident perpendicularly on a plane. Since p is determined by the kind and composition of ester groups and temperature, a selective reflection for light having the same wave length as that of the laser beam used for reading can be attained by suitably selecting the kind and composition ester groups, the output of laser beam for writing and conditions for irradiation of pulses.

The recording medium using the thermotropic cholesteric liquid crystalline glutamate copolymer described above as a recording material is best suited for an optical disc memory which employs a laser beam such as He-Ne or semiconductor laser beam to effect writing and reading. It is employable not only as a recording medium for postscript type optical discs but also as a recording medium for rewritable optical discs.

The following examples are given to further illustrate the present invention.

REFERENCE EXAMPLE 1

20 g of poly(γ-benzyl-L-glutamate)(molecular weight: 15,000, average polymerization degree: 69) prepared by the NCA process was dissolved in 300 ml of 1,2-dichloroethane, then 150 ml of n-dodecyl alcohol and 5 g of p-toluenesulfonic acid were added and reaction was allowed to take place at 60° C. for 15 hours. The reaction solution was poured into a large amount of methanol to precipitate the polymer produced, followed by filtration and drying. Then, the polymer was dissolved in 1,2-dichloroethane and reprecipitated with methanol, followed by filtration and drying, to obtain a purified γ-benzyl-L-glutamate/γ-dodecyl-L-glutamate copolymer. The ratio of the benzyl ester to the dodecyl ester in the copolymer was determined by NMR and found to be 61:39.

EXAMPLE 1

A 5% solution of the polymer prepared in Reference Example 1 in 1,2-dichloroethane was applied onto a poly(4-methyl-1-pentene) base to a thickness after drying of 1 μm by means of a spinner. After air-drying at room temperature, the coating was vacuum-dried for 2 hours at the same temperature to obtain a recording layer. Then, a black sheet was put on the recording layer, and a polyethylene terephthalate film was put thereon, then the outer peripheral portion was sealed with an epoxy resin-based sealant to obtain a disc of a four-layer structure.

Then, a beam of light from a semiconductor laser (intensity: 5 mW) of an oscillation wave length of 0.83 μm was focused to a 1 μm spot by means of a lens and there was made writing through a base while the base was rotated at a linear velocity of 1 m/sec.

At the recorded portion, light beam 1 μm in diameter and 0.83 μm in wave length was reflected 39% without formation of any small hole, while the reflectance at non-recorded portion was 5%. Thereafter, the laser beam intensity was reduced to 1 mW and reproduction was performed through the base. As a result there was obtained a value of 56 dB in terms of S/N ratio.

EXAMPLE 2

He-Ne laser beam was focused into an elliptic form having a major axis of 10 μm and a minor axis of 1 μm by means of a lens and was applied to the disc after writing in Example 1. As a result, the reflectance of the 0.83 μm light beam at the recorded portion also became 5% and thus the record was erased completely. Then, writing was made again to the disc after erasing in the same way as in Example 1. After preservation for three months at a temperature of 80° C. and a relative humidity of 80%, there was conducted a reproduction experiment. As a result, a value of 56 dB in terms of S/N ratio was obtained and no deterioration was observed.

EXAMPLES 3-8

Various glutamate copolymers were prepared in the same way as in Reference Example 1 and discs were made in the same manner as in Example 1. Then, using the discs, there were conducted the reproduction experiment, erasing experiment and preservation test described in Examples 1 and 2. Results, which are set out in Table 1, show that the resulting recording media are superior in performance.

TABLE 1

| Example | $R_1$ | $R_2$ | m + n | m/n | S/N Ratio (dB) | Erasability | S/N Ratio (d/B) after 3 months |
|---|---|---|---|---|---|---|---|
| 3 | benzyl | undecyl | 100 | 60/40 | 56 | good | 56 |
| 4 | benzyl | hexadecyl | 75 | 52/48 | 55 | good | 54 |
| 5 | methyl | hexyl | 250 | 34/66 | 57 | good | 57 |
| 6 | butyl | dodecyl | 510 | 71/29 | 52 | good | 52 |
| 7 | cyclohexyl | dodecyl | 68 | 59/41 | 54 | good | 54 |
| 8 | cyclohexyl | hexadecyl | 150 | 32/68 | 56 | good | 55 |

Note
In the above table, $R_1$, $R_2$, m + n and m/n are the same as those used in the general formula.

As set forth hereinabove, the recording medium of the present invention is inexpensive, free of toxicity, can be formed into a thin film easily, permits writing at a low energy using laser beam, exhibits a high S/N ratio in reproduction, has an excellent preservability, and is rewritable. It is suitable for use as a postscript type optical disc memory or a rewritable type optical memory.

What is claimed is:

1. a method of recording information on a recording medium which comprises:
   (a) contacting a cholesteric liquid crystal forming recording layer with laser beam radiation effective to increase the temperature of the film to form a cholesteric liquid crystal; and
   (b) removing the laser beam radiation from the layer, to rapidly cool the irradiated area of the layer and fix the cholesteric liquid crystal structure whereby information is recorded in the liquid crystal structure, said cholesteric liquid crystal forming recording layer being provided on a base to form the recording medium and said recording layer consisting essentially of a thermotropic cholesteric liquid crystalline glutamate copolymer represented by the following general formula:

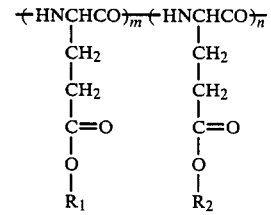

wherein $R_1$ is an alkyl, cycloalkyl, aryl or arylalkyl group having not more than 10 carbon atoms, $R_2$ is an alkyl, cycloalkyl, aryl or arylalkyl group having 6 to 30 carbon atoms, provided $R_1$ and $R_2$ are not the same, m and n are in the relation of $50 \leq m+n$ 2,000, m/n = 80~10/20~90 and the number of carbon atoms of $R_2$ is larger by at least five than that of $R_1$.

2. A method according to claim 1 including the following additional step of reading information from the recording layer which comprises:
   reflecting light of a specific wave length dependent on the cholesteric pitch of the cholesteric liquid crystal of step (b) from the irradiated area of the recording layer under conditions of reflectance or transmissivity effective to read the recorded information.

3. A method according to claim 1 including the following additional step of erasing recorded information from the recording layer which comprises:

heating and then cooling the irradiated area of the recording medium under conditions effective to cause relaxation of the cholesteric structure of the irradiated area to take place and the selective reflection ability of the irradiated area to be eliminated thereby causing the recorded information to be erased.

4. A method according to claim 1, wherein m/n is 70~40/30~60.

* * * * *

UNITED STATES PATENT AND TRADEMARK OFFICE
CERTIFICATE OF CORRECTION

PATENT NO. : 4,857,427
DATED : August 15, 1989
INVENTOR(S) : Hiroyuki Itoh, et al.

It is certified that error appears in the above-identified patent and that said Letters Patent is hereby corrected as shown below:

Column 6, line 27, Claim 1: "a" should read as --A--

Column 6, lines 59-60, Claim 1: "n 2,000" should read as --$n \leq 2,000$--

Column 6, line 64, Claim 2: "reading information" should read as --reading recorded information--

Column 7, line 7, Claim 3: "then cooling" should read as --then slowly cooling--

Signed and Sealed this

Fourteenth Day of August, 1990

Attest:

HARRY F. MANBECK, JR.

*Attesting Officer*     *Commissioner of Patents and Trademarks*